June 29, 1937.  A. F. HICKMAN  2,085,021

STEERING MECHANISM FOR VEHICLES

Filed Oct. 1, 1934  3 Sheets-Sheet 1

INVENTOR
Albert F. Hickman
BY
Popp & Popp
ATTORNEYS

June 29, 1937.  A. F. HICKMAN  2,085,021

STEERING MECHANISM FOR VEHICLES

Filed Oct. 1, 1934  3 Sheets-Sheet 2

INVENTOR
Albert F. Hickman
BY
Popp & Popp
ATTORNEYS

June 29, 1937.　　A. F. HICKMAN　　2,085,021
STEERING MECHANISM FOR VEHICLES
Filed Oct. 1, 1934　　3 Sheets-Sheet 3

INVENTOR
Albert F. Hickman
BY
Popp & Popp
ATTORNEYS

Patented June 29, 1937

2,085,021

UNITED STATES PATENT OFFICE 2,085,021

STEERING MECHANISM FOR VEHICLES

Albert F. Hickman, Eden, N. Y., assignor to Hickman Pneumatic Seat Co., Inc., Eden, N. Y., a corporation of New York Application October 1, 1934, Serial No. 746,362

6 Claims. (Cl. 280—87)

This invention relates to a steering mechanism for steering the front or dirigible wheels of a vehicle and relates more particularly to a steering mechanism associated with the reversed Elliott or other type of Ackerman axle in which the dirigible wheels which are independently pivoted on spindles at opposite ends of the front axle and have said spindles operatively connected together by means of a cross link, the distance between the pivots of which is different from the distance between the spindles.

One of the primary objects of the invention is to enable the dirigible wheels to be turned exclusively by the manually operated steering wheel and not turned as a consequence of axle movement. The other primary object of the invention is to absorb, as much as possible, those shocks, which are caused by unevenness in the roadbed and tend to turn the dirigible wheels to the right or left and would otherwise travel up through the steering linkage to the manually controlled steering wheel. Numerous other collateral objects of the invention and practical solutions thereof are disclosed in detail in the herein patent specification, wherein in the accompanying drawings:—

Figure 3:
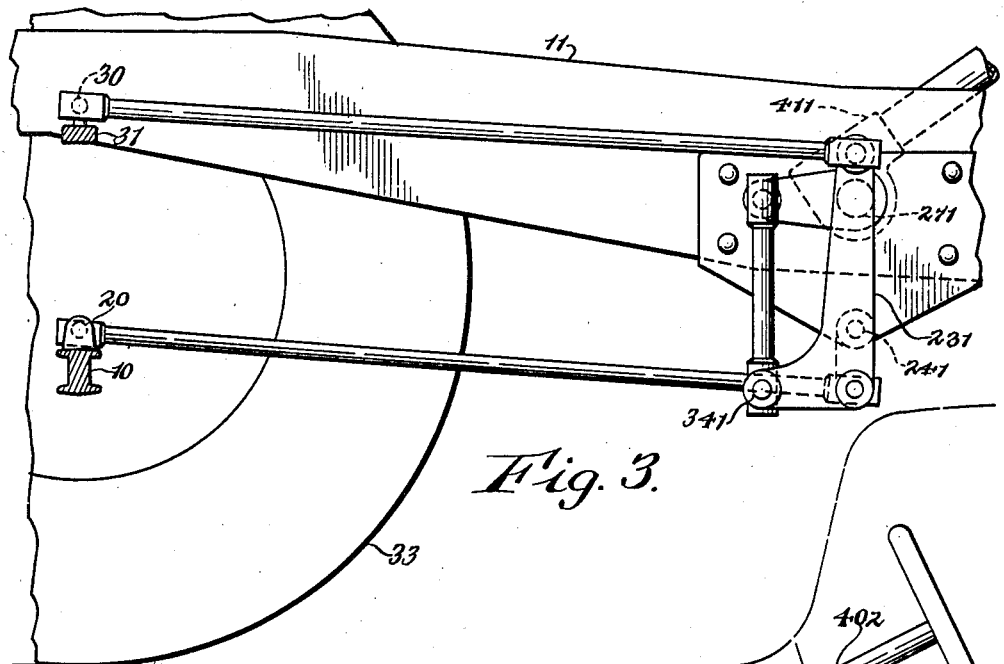
Figure 4:
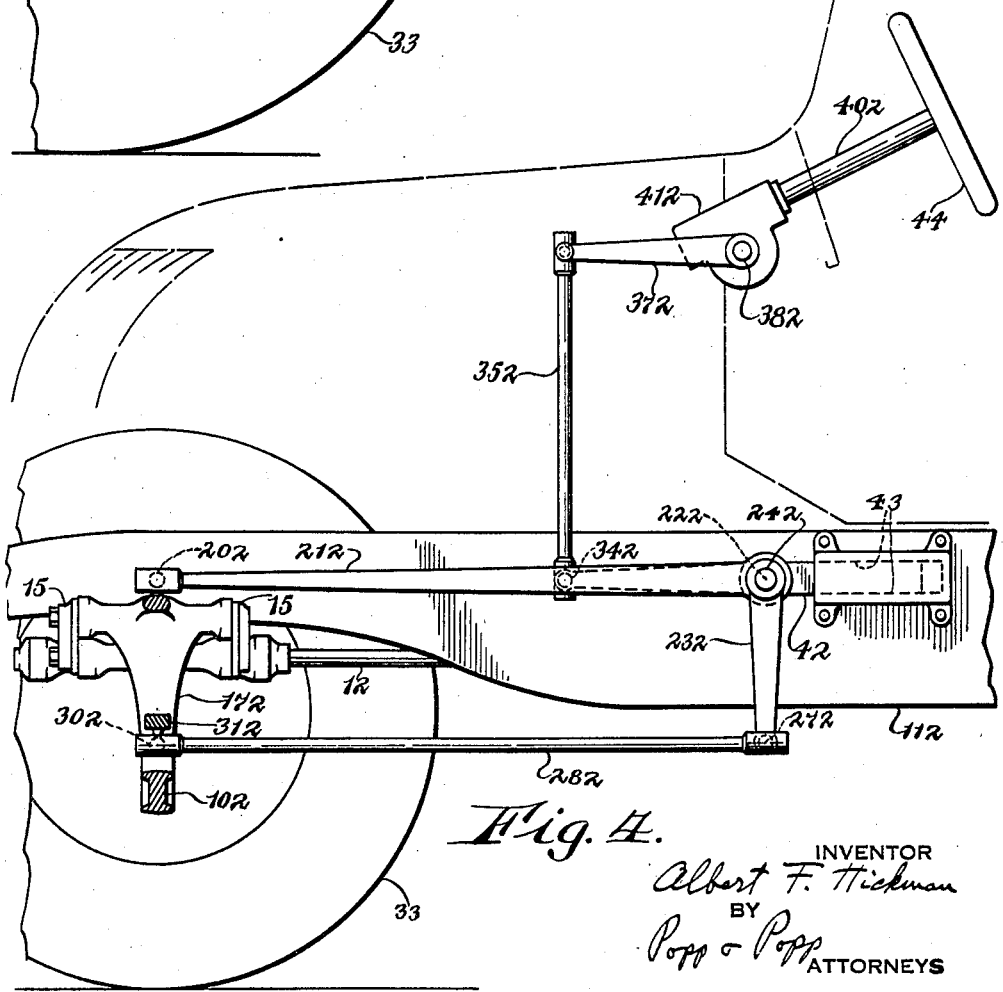
Figure 5:
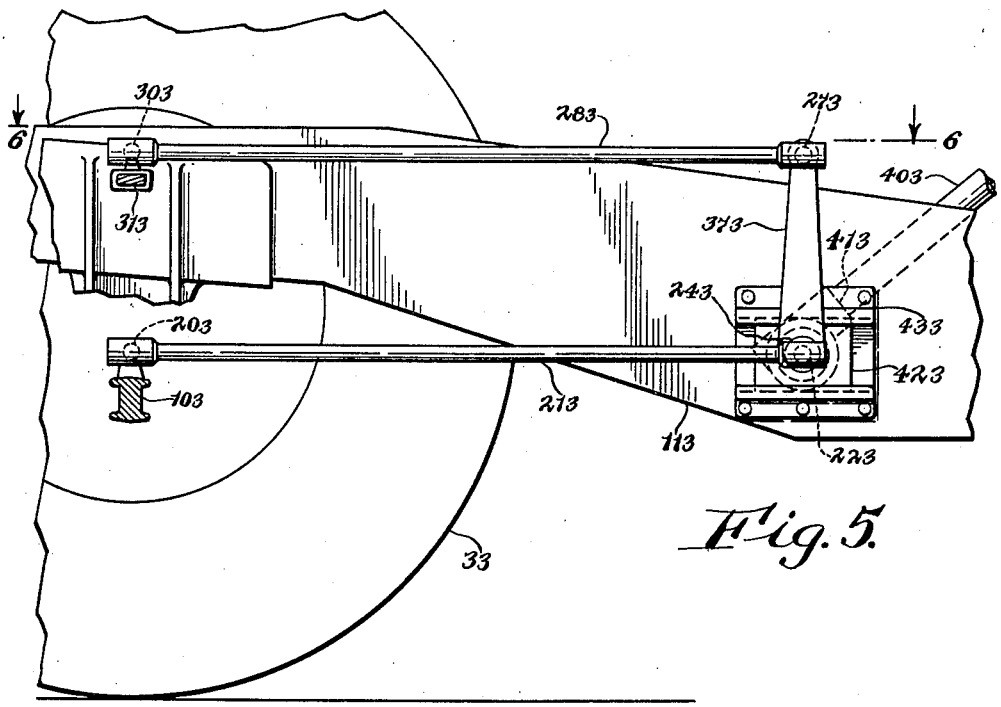

Figures 3, 4, and 5 are fragmentary side elevations of the front ends of vehicles equipped with modified forms of the invention.

Figure 6:
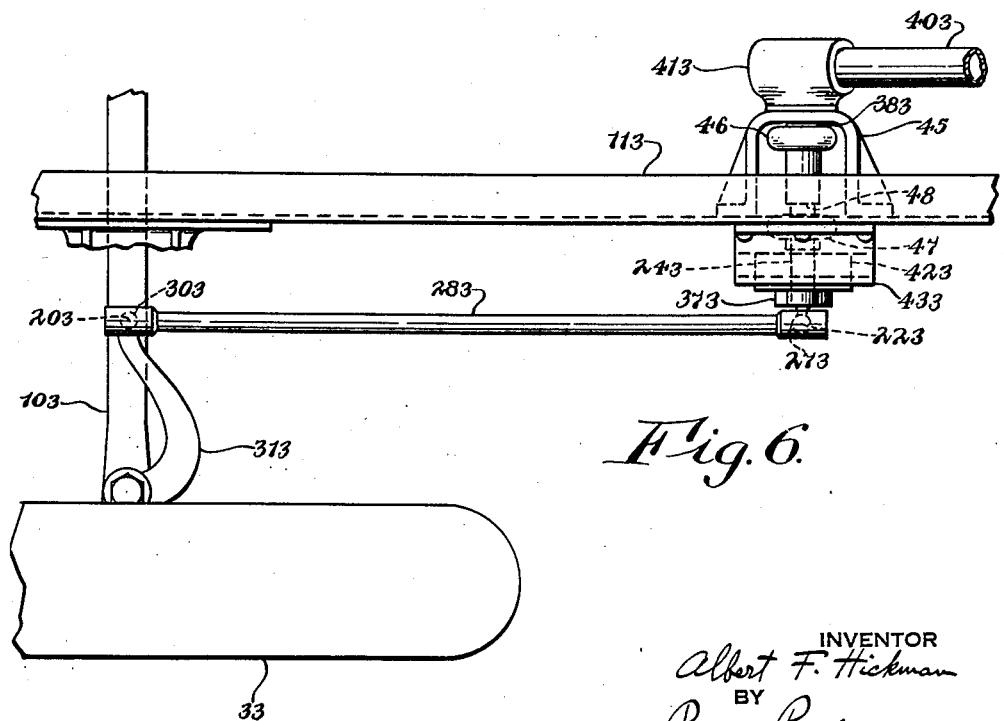

Figure 6 is a fragmentary top plan of the form of the invention shown in Fig. 5 and taken on line 6—6 Fig. 5.

In the following description similar characters of reference indicate like parts in the several figures of the drawings:—

The present invention is an improvement upon my co-pending patent application for Control linkage for vehicles, Ser. No. 609,961 filed May 7, 1932 and a continuation in part of and an improvement upon the steering mechanism of my co-pending patent application for Vehicle spring suspension Ser. No. 713,161 filed Feb. 27, 1934 (see particularly Fig. 5 thereof).

In these days of high speed automobiles, trucks and other similar dirigible land vehicles, it is very important that the front, steering or dirigible wheels of the vehicle be compelled to hold a true course and not be allowed to be deflected to the right or left as a consequence of up and down axle movement. This is because, at high speeds, such deflections are not only uncomfortable but occasionally actually dangerous and frequently cause violent wheel shimmy at certain critical speeds, particularly if the weights and diameters of the dirigible wheels are relatively large and the wheels and/or tires not accurately balanced.

At the same time it is essential, of course, that said dirigible wheels be easily and positively deflected or turned to the right or left by the operator of the vehicle so as to enable him to guide the vehicle along the highway.

Another factor to be taken into consideration is that, as the vehicle travels along the roadway, its dirigible wheels tend to be deflected to the right or left by impact forces caused by irregularities in the roadway.

At very high vehicle speeds the amount of impact involved in such forces is very large, and it becomes important not only to prevent such road irregularities from deflecting the dirigible wheels but also to absorb the impacts themselves and prevent them from being carried up through the steering gear to the hands of the operator.

Figure 1:
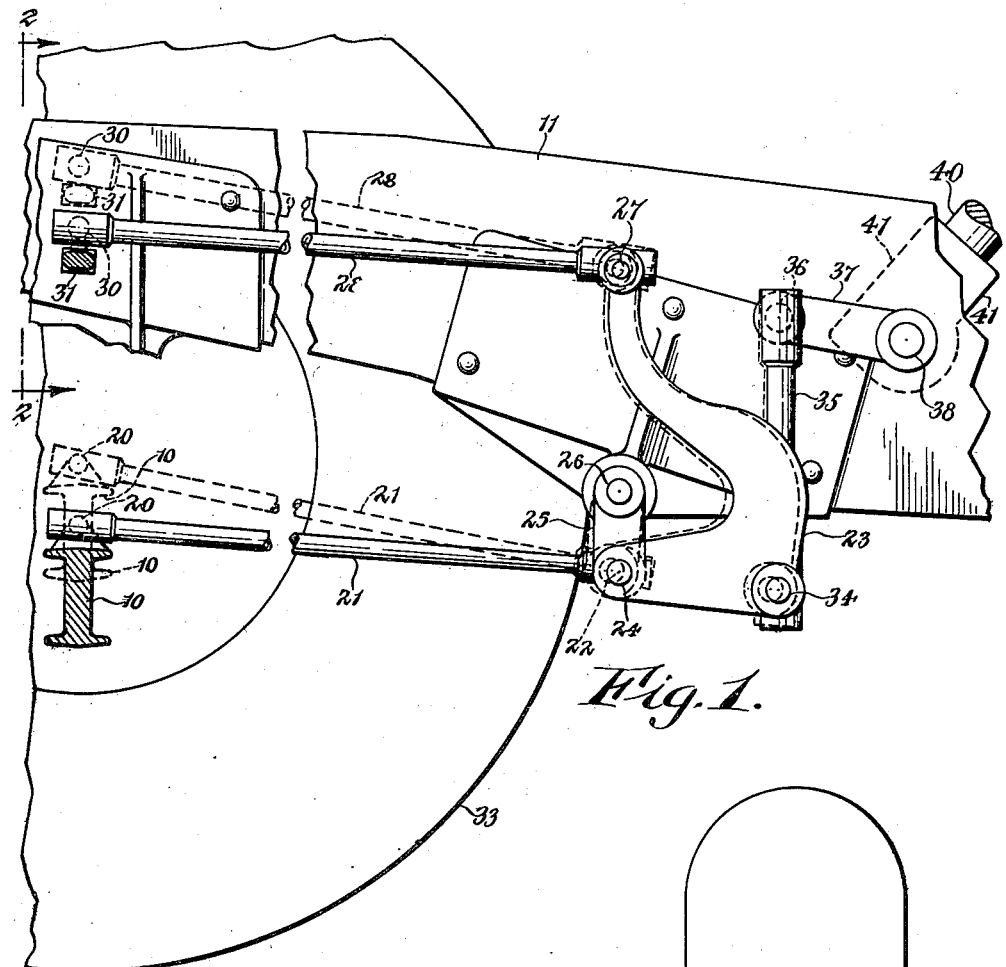
Figure 1 is a fragmentary, side elevation of the front end of a vehicle equipped with one form of my invention and provided with the torsion rod type of vehicle spring suspension shown in my patent application for Vehicle spring suspension Ser. No. 713,161 filed Feb. 27, 1934.

It has long been common knowledge that the dirigible wheels may be turned by the manual steering wheel but, at least when the force is suddenly applied, prevented from themselves turning the manual steering wheel by the provision of a suitable semi-irreversible steering gear such as a worm and worm wheel steering gear 41 of Fig. 1. It has also been long known that these shocks which are caused by the dirigible wheels attempting to turn the manual steering wheel can be absorbed by inserting small compression springs at various points in the steering linkage, usually in both ends of the drag link and cross connecting link. A more recent method of absorbing such shocks is to use a resiliently supported shackle at the front end of the front left spring.

Such shock absorbing or softening methods have, however, the serious disadvantage that the turning of the dirigible wheels is not directly under the control of the steering gear of the vehicle, but instead said dirigible wheels may be turned in the one or other direction, by reason of said road irregularities, against the force of these resilient members. As a consequence, said shocks frequently cause shimmys or periodic deflectional vibrations of the dirigible wheels particularly at certain critical vehicle speeds.

In the present invention the dirigible wheels are prevented from being deflected as a consequence of axle movement. This eliminates one of the heretofore important causes of wheel shimmy; namely, that due to the deflection of the dirigible wheels as a consequence of axle movement. In addition to this in the present invention the power connection between the steering gear and the dirigible wheels is made positive without any resilient connections. This eliminates the only other direct cause of wheel shimmy; namely, that due to deflection of the dirigible wheels as a consequence of road irregularities. As a result the present invention entirely eliminates wheel shimmy. Furthermore, and despite the positive connection employed in the present invention, all shocks resulting from the pressures which emanate from road irregularities and tend to deflect the dirigible wheels are almost entirely absorbed before they reach the steering gear 41.

Figure 2:
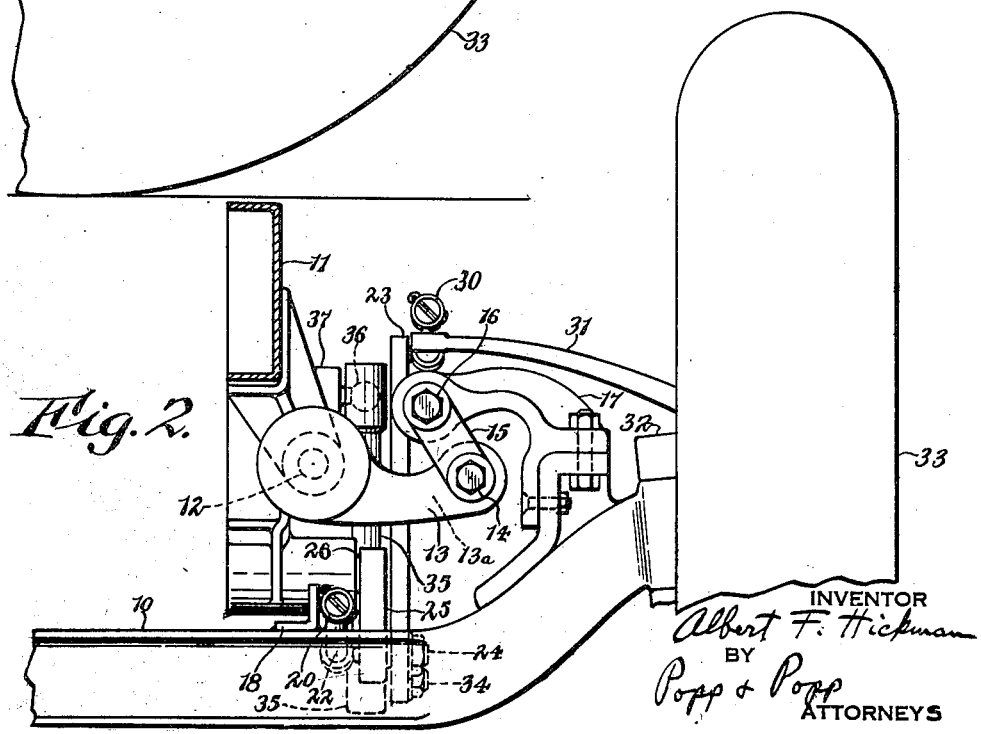
Figure 2 is a fragmentary front end elevation thereof, taken on line 2—2 Fig. 1.

*Figs. 1 and 2*

The front axle 10 of the vehicle may be resiliently connected with the front end of the vehicle frame 11 in any desired manner. The particular front axle resilient connection illustrated in the accompanying drawings is similar to that shown in my patent application for Vehicle spring suspension Ser. No. 713,161 filed Feb. 27, 1934. This consists (as far as the front axle 10 is concerned) of a torsion rod 12 disposed horizontally and longitudinally on each side of the vehicle and suitably anchored at its rear end to the vehicle frame 11 and suitably secured at its front end to a pair of crank arms 13 and 13a. Pivoted to the outer ends of said crank arms at 14 are a pair of links 15, the upper ends of which are pivoted at 16 to a bifurcated axle bracket 17 secured to the adjacent end of the front axle 10.

By reason of this construction said front axle 10 is only permitted to move in a vertical plane (although its one end is free to rise above or fall below its other end). The present invention, however, is not confined to any such a limitation as to the vehicle spring suspension in general, but is applicable to any type of spring suspension including, for instance, the ordinary semi-elliptic spring suspension in which the axle moves not only vertically but also to a certain extent horizontally.

Secured to the upper face of the front axle 10 is a bracket 18, the upper outer portion of which is connected by a ball and socket joint 20 with the front end of a substantially horizontal, longitudinal distancing link or radius rod 21. The rear end of the latter is connected by a ball and socket joint 22 with the lower arm of a bell crank 23. The center of rotation of said ball and socket joint 22 lies in a horizontal transverse line which constitutes the axis of rotation of a compensating pivot 24. The latter pivotally connects the lower arm of said bell crank lever 23 with the lower end of a short link or shackle 25. The upper end of said shackle is pivoted at 26 to the frame 11 of the vehicle.

A ball and socket joint 27 connects the upper arm of the bell crank 23 with the rear end of a substantially horizontal and longitudinal drag link 28. The latter is preferably of the same length as the length of the radius rod 21. The front end of said drag link is connected by a ball and socket joint 30 with the inner end of the usual spindle arm 31 which is integrally connected with the usual front or dirigible wheel spindle 32. This spindle is pivoted in the usual and well known manner on the outer end of the front axle 10 and is provided with an outwardly projecting spindle shaft upon which the companion dirigible wheel 33 is rotatably mounted in the usual and well known manner.

It is to be understood that the two front or dirigible wheels which are arranged at opposite ends of the front axle 10 are connected together by a cross steering link (not here shown) in the usual and well-known manner.

The rear end of the lower arm of the bell crank 23 is pivoted at 34 to the lower end of a steering link 35, the upper end of which is pivoted at 36 to the usual steering arm 37. This steering arm is formed in the usual and well-known manner at the outer end of a steering gear shaft 38 which is suitably actuated through the steering column 40 by a worm, cam and pin or other semi-irreversible gearing herein designated the steering gear 41.

*Analysis of Figs. 1 and 2*

For any given momentary position of the front axle 10 and its ball and socket joint 20 relatively to the frame 11, the position of the compensating pivot 24 is fixed relatively to the frame 11. Under these conditions if the operator of the vehicle partially rotates the steering arm 37 in the one or other direction the rear pivot 34 of the bell crank 23 is similarly actuated. Said bell crank under these circumstances is fulcrumed on the compensating pivot 24 and its movement about said pivot causes the drag link 28 to be actuated in accordance with the amount of rotation of the steering arm 37, thereby steering the vehicle in the one or other direction desired by the operator.

We will now change the conditions and assume that the vehicle is travelling along the road and is momentarily not being steered by the operator of the vehicle. Under these circumstances the pivot 36 of the steering arm 37 is in a fixed position relatively to the frame 11 of the vehicle and the one or both ends of the front axle 10 will be moved up or down because of a roadway irregularity. Let it be assumed, for instance, that said front axle with its ball and socket joint 20 moves upwardly, as shown by dotted lines in Fig. 1. This upward movement of said ball and socket joint 20 causes a substantially horizontal forward movement of the ball and socket joint 22 and compensating pivot 24, thereby pulling the bell crank 23 substantially translationally forwardly on the shackle 25 and steering link 35, the upper pivot 26 of said shackle 25 being pivoted directly on the frame 11 and the upper pivot 36 of said steering link 35 being momentarily fixed relatively to the frame 11 under these particular conditions.

This substantially translational forward movement of said bell crank 23 causes its upper ball and socket joint 27 to be moved forwardly substantially the same distance that its lower ball and socket joint 22 is moved forwardly. Because of this fact and because, furthermore, the drag link 28 and radius rod 21 are of the same length, it follows that the steering arm joint 30 is not moved horizontally relatively to the axle joint 20 and front axle 10. Now, inasmuch as steering of the vehicle is effected by a horizontal movement of said steering arm joint 30 relatively to said front axle 10, it follows from the foregoing that the axle movement has not caused any steering of the vehicle, i. e., any lateral turning or deflection of the dirigible wheels 33.

Theoretically the distance between the steering link pivots 36 and 34 should be the same as the distance between the shackle pivots 24 and 26. In such case a movement of the pivot 24 would cause a pure and exact translational movement of the bell crank 23. In actual practice, however, this would necessitate a very long shackle 25 which would have to be very unwieldy to properly carry the bell crank 23 which it supports. Actual test has shown that the construction shown is eminently practical and successful and it is therefore preferred.

It is to be noted that if the front axle 10 moves both horizontally and also vertically as in the ordinary semi-elliptic spring construction, the same result is obtained, in such case both pivots 20 and 30 moving horizontally relatively to the vehicle frame 10 but not moving horizontally relatively to each other, and hence causing no deflection of the dirigible wheels 33 as a consequence of such axle movement.

It follows from the foregoing that the dirigible wheels 33 may be steered by an appropriate movement of the steering arm 37 but are not deflected because of either vertical or longitudinal or angular axle movement.

It is also to be noted that in the present invention no resilient members are interposed in the steering linkage between the steering spindle 32 and the steering gear 41. This means that road irregularities cannot set up periodical deflectional vibrations (shimmys) of the dirigible wheels 33 such as do occur in present day automobiles which usually have resilient connections at both ends of the drag link and cross connecting link, and sometimes also have a resilient shackle at the front end of the front, left, semi-elliptic spring.

When the vehicle passes over an irregular roadway there is a tendency to deflect the dirigible wheels 33 to the right or left if the surface in contact with either one of the wheels does not lie in a plane intersecting a line perpendicular to the direction of movement of the vehicle. Any actual turning of the dirigible wheels is prevented, at least when the force is suddenly applied, by the semi-irreversible steering gear 41. But the impact forces which tend to deflect the dirigible wheels should be absorbed, as otherwise the steering gear 41 receives such a heavy and constant pounding that actual tests have shown cannot be carried by present day steering gears without fracturing or loosening up. Heavier and sturdier steering gears could undoubtedly be designed but even that would not be a complete solution, because the impact forces would in such a case be finally resisted by the frame of the car and hence would cause violent and disagreeable vibration of the frame.

In the past such impact forces have been absorbed by various resilient devices interposed in the steering linkage or between the vehicle springs and the frame. But such methods of absorbing deflecting impact forces is unsatisfactory in that it sets up wheel shimmy at certain critical speeds as has been previously mentioned.

In the present invention these impact forces which are caused by irregularities in the road and which tend to deflect the dirigible wheels 33 are absorbed by both inertia and by breaking up each of said forces into a plurality of components which are disposed at an angle to each other and hence largely neutralize each other.

We will assume, for example, that a certain road irregularity is so tending to deflect the one or other of the dirigible wheels 33 that a rearward force is imposed upon the axle joint 20. In the present invention the radius rod 21 and the other parts of the steering mechanism are constructed considerably heavier than would be necessary to merely carry the forces which are imposed upon them. Because of this heavy construction, the radius rod 21 and the other parts of the steering mechanism directly absorb a large portion of the impact force. This absorption results from the fact that said impact force is to a considerable extent counteracted by the inertia of the steering mechanism members. It is admitted that no great movement of any of said members or of the individual molecules thereof takes place but actual practice has shown that no great movement is required. This is because this whole question of deflecting impact forces only becomes serious at high vehicle speeds, and at such speeds the speed of the impact force is necessarily also high. The amount of energy which can be absorbed by inertia is, of course, a direct function of the speed of the applied force, and as this speed is high it follows that only an infinitesimal movement and distortion of the steering mechanism is necessary to absorb a large portion of such impact forces. Even if the individual members of the steering mechanism are very light, a certain fraction of each impact force is absorbed by inertia, but the amount of absorption is greater when said members are constructed of heavy material and/or of large dimensions. The fact that large dimensions are advantageous has the collateral advantage that the members of the steering mechanism may be constructed of cheap material which need never be stressed beyond their fatigue limits and hence are both inexpensive and safe.

When a rearward impact force is received by the axle joint 20, whatever certain amount of said force is not absorbed by the inertia of the radius rod 21 is received in a rearward direction by the bell crank pivot 24. The line of said force is the line which intersects the axis of said bell crank pivot 24 and the center of oscillation of the axle ball and socket joint 20. To reach the steering gear 41, however, this impact force has first to meet the inertia of the bell crank 23 itself and then is compelled to change its direction and flow vertically up the steering link 35. The fact that this force is thus compelled to change its direction means that a certain component of said force is received by the pivot 34 in a direction which is not coincident with the axis of the steering link 35. This force component is necessarily subtracted from the total impact force directed upwardly against the steering arm pivot 36 and hence may be said to "absorb" some of said impact force.

In addition to this, said force component may itself be resolved into a number of sub-components, some of which are directly in line with and opposed to sub-components of the other pivots of the steering mechanism. For instance, one component of the pivot 34 would be horizontal and rearward. Because the impact force is being delivered up through the steering link 35, it follows that the momentary fulcrum of the bell crank 23 is its pivot 24. From this it follows that at the bell crank joint 27 will be a component which is horizontal and forward. It is obvious that these impact force components of the joint 27 and the pivot 34 may be resolved into sub-components, one pair of which are directly in line with each other and acting in opposite directions. And even the sub-components which do not balance each other are nevertheless effective in absorbing the impact force by reason of the fact that said relatively large impact force is broken up into a number of small forces acting in different directions. In an ordinary steering mechanism any impact force received by the steering spindles can only flow up to the steering gear. In the present invention some of the original impact force does flow to the steering gear 41 but not all because a certain amount is bled off through the radius rod 21 and delivered to the axle. There it is met by the inertia of the axle, wheels etc. and is also split up into sub-components of force, some of which counteract each other and others of which reduce the originally received force into a number of small components pointing in different directions. This bleeding off is also, therefore, a means of absorbing the original impact force as far as the operator and passengers of the vehicle are concerned.

*Figure 3*

This figure illustrates one way in which the invention may be varied without departing from the principles of the invention. In this case the upper pivot 271 of the bell crank lever 231 is normally located directly above the shackle pivot 241, just as the pivots 27 and 24 are located in Fig. 1. The actuation of said bell crank lever 231 is however effected from the front at the pivot 341 instead of from the rear, as in Fig. 1. This construction is of particular advantage when the steering gear 411 operates in the opposite direction from that shown in Fig. 1.

*Figure 4*

This construction is similar to that of the foregoing constructions except that instead of supporting the steering fulcrum pivot 242 on the frame on a shackle it is supported on a slidable head 42 which is horizontally and longitudinally slidable within a guide 43 secured to the frame 112 of the vehicle. Furthermore, the radius rod 212 is arranged above instead of below the drag link 282, the front end of said radius rod being connected by a ball and socket joint 202 with the front axle 102 through the bifurcated axle bracket 172, while the front end of the drag link 282 is connected by a ball and socket joint 302 with the steering spindle arm 312.

The transmission of power by which steering of the vehicle is effected is as follows:—

The operator turns the steering wheel 44 and this turns the usual steering torque shaft located within the steering column 402 and actuates the worm and worm wheel sector of the steering gear 412, and through them the steering gear shaft 382, steering arm 372 and steering link 352. The lower end of said steering link is pivoted at 342 to the front end of the bell crank 232 which as far as steering is concerned, is fulcrumed at the apex of its arms at pivot 242 on the slidable head 42. Behind said pivot 242 and axially in line therewith is located a ball and socket joint 222 which connects said slidable head 42 with the rear end of the radius rod 212. The lower arm of the bell crank 232 is connected by a ball and socket joint 272 with the rear end of the drag link 282. Thus when the operator actuates the steering wheel 44 the bell crank 232 fulcrums on its pivot 242 and the dirigible wheels 33 are turned to the right or left as may be desired.

When the axle is moved up or down because of a roadway irregularity, the vertical movement of the front radius rod joint 202 causes a horizontal movement of the sliding head pivot 242. This causes a substantially translational movement of the bell crank 232 due to the fact that its steering link pivot 342 is constrained to move substantially horizontal. Hence, the rear drag link pivot 272 is caused to move horizontally the same distance horizontally as the sliding head pivot 242 and, as a consequence, the front drag link joint 302 is moved horizontally the same distance as the front radius rod joint 202. Thus the movement of the axle 102 is prevented from turning the dirigible wheels 33.

*Figs. 5 and 6*

In this construction the drag link 283 is arranged above the radius rod 213 as in Figs. 1-3, but the sliding head of the general type of Fig. 4 is employed, and, in addition to this, the bell crank lever entirely dispensed with. The front end of the drag link 283 is connected by a ball and socket joint 303 with the steering spindle arm 313 while its rear end is connected by a ball and socket joint 273 with the upper end of a crank arm 373. The lower end of said crank arm is provided with a crank shaft 243 which is journaled in a slidable head 423 slidably arranged on the vehicle frame 113 in a horizontal slide or guide 433. The radius rod 213 is connected at its rear end by a ball and socket joint 223 with said slidable head 423 in axial alignment with the crank shaft 243. The front end of said radius rod 213 is connected by a ball and socket joint 203 with the front axle 103.

The steering gear 413 is mounted on a suitable bracket 45 on the vehicle frame 113 and derives its power through the usual steering column 403 and is provided with the usual steering gear shaft 383. The power connection between said steering gear shaft 383 and the crank shaft 243 is necessarily of the flexible or equivalent type and is preferably effected through a pair of universal joints 46 and 47 and a slidable, splined connection 48. Thus, while the axis of the steering gear shaft 383 is fixed relatively to the frame 113, the axis of the crank shaft 243 is longitudinally movable relatively to said frame, so that power may be delivered from said steering gear shaft to said crank shaft when the steering gear 413 is actuated, and yet no movement of the dirigible wheels 33 effected as a consequence of axle movement.

I claim as my invention:—

1. A steering mechanism associated with the axle, steering gear and steering spindle of a vehicle and comprising: a compensating pin; a radius rod connecting said pin with the axle; a lever pivotally mounted on said pin; means connecting said lever with the steering gear; and a drag link connecting said lever with the steering spindle; the length of said drag link being approximately the same as the length of the radius rod.

2. A steering mechanism associated with the axle, steering gear and steering spindle of a vehicle and comprising: a compensating pin; a radius rod connecting said pin with the axle; a lever pivotally mounted on said pin; means connecting said lever with the steering gear; and a drag link connecting said lever with the steering spindle; said drag link being of approximately the same length as and disposed substantially parallel with the radius rod.

3. A steering mechanism associated with the frame, axle, steering gear and steering spindle of a vehicle and comprising: a compensating pin; a shackle link pivoted at one end on the frame and at its other end on said pin; means connecting said pin with the axle; a lever pivoted on said pin; a steering link connecting said lever with the steering gear and normally disposed parallel with the shackle link; and means connecting said lever with the steering spindle.

4. A steering mechanism associated with the axle, steering gear and steering spindle of a vehicle and comprising: a compensating pin; means connecting said pin with the axle; a lever pivoted on said pin; a drag link connecting said lever with the steering spindle; and a steering link connecting said lever with the steering gear and normally disposed parallel to a line joining the pin with the joint between the lever and the drag link.

5. A steering mechanism associated with the frame, axle, steering gear and steering spindle of a vehicle and comprising: a compensating pin; a shackle link pivoted at one end on the frame and at its other end on said pin; means connecting said pin with the axle; a lever pivoted on said pin; means connecting said lever with the steering gear; and a drag link connecting said lever with the steering spindle, the connection between said drag link and said lever being normally in line with the pivots on said shackle link.

6. A steering mechanism associated with the frame, axle, steering gear and steering spindle of a vehicle and comprising: a compensating pin; a shackle link pivoted at one end on the frame and at its other end on said pin; means connecting said pin with the axle; a lever pivoted on said pin; a drag link connecting said lever with the steering spindle; and a steering link connecting said lever with the steering gear and normally disposed parallel to a line passing through the pivots of the shackle link and the joint between the lever and the drag link.

ALBERT F. HICKMAN.